United States Patent [19]

Anxionnaz

[11] 3,951,360
[45] Apr. 20, 1976

[54] DEVICE FOR REGULATING AND RECOVERING THE BOUNDARY LAYER OVER THE SURFACE OF A BODY SUCH AS AN AIRCRAFT IN FLIGHT

[76] Inventor: Rene Anxionnaz, 8, rue Nicolas Chuquet, 75-Paris, France

[22] Filed: July 2, 1974

[21] Appl. No.: 485,272

[30] Foreign Application Priority Data
July 5, 1973 France .............................. 73.24706

[52] U.S. Cl. ........................ 244/42 CE; 114/67 R
[51] Int. Cl.² ........................................ B64C 21/08
[58] Field of Search ......... 244/42 CE, 42 CF, 42 C, 244/130; 114/67 R

[56] References Cited
UNITED STATES PATENTS

| | | | |
|---|---|---|---|
| 1,957,413 | 5/1934 | Price | 244/42 CF |
| 2,041,786 | 5/1936 | Stalker | 244/42 CF |
| 2,071,744 | 2/1937 | Henrikson | 244/42 CF |
| 2,406,920 | 9/1946 | Stalker | 244/42 CE |
| 2,443,936 | 6/1948 | Stalker | 244/42 CE |
| 2,568,813 | 9/1951 | Lundberg | 244/42 CF UX |
| 2,742,247 | 4/1956 | Lachmann | 244/42 CE |
| 2,751,168 | 6/1956 | Stalker | 244/42 CE X |

FOREIGN PATENTS OR APPLICATIONS

| | | | |
|---|---|---|---|
| 743,598 | 1/1956 | United Kingdom | 244/42 CE |
| 1,531,422 | 1/1970 | Germany | 244/42 CE |

Primary Examiner—Trygve M. Blix
Assistant Examiner—Galen L. Barefoot
Attorney, Agent, or Firm—A. W. Breiner

[57] ABSTRACT

In order to control the boundary layer of air over the outer surface of an airframe and to recover some of its energy, portions of this boundary layer are sucked at a multiplicity of locations distributed over this surface and thereafter discharged rearwardly as a jet contributing to propulsion. Such suction takes place through orifices having inlets directed towards the rear and the sucked flow is adjusted so as to draw off only a part of the boundary layer whose velocity relative to the airframe is but a minor fraction of the absolute velocity of the latter, thereby leaving a substantial thickness of boundary layer.

2 Claims, 9 Drawing Figures

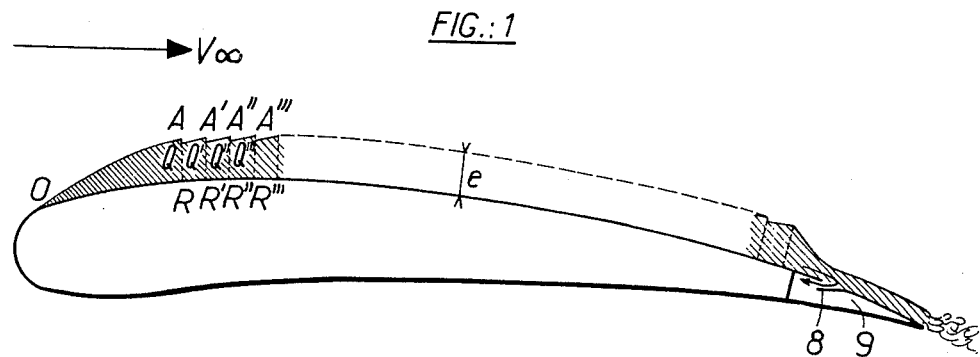
FIG.:1
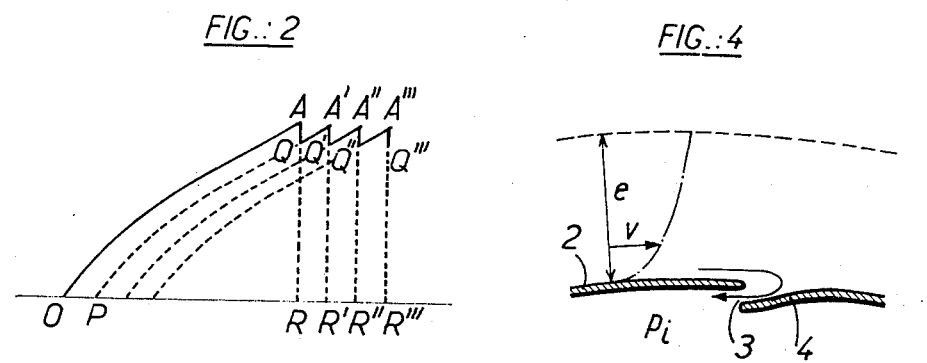
FIG.:2
FIG.:4
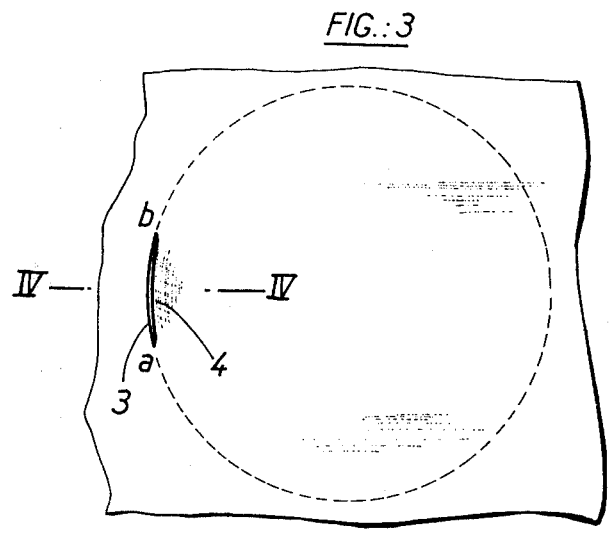
FIG.:3

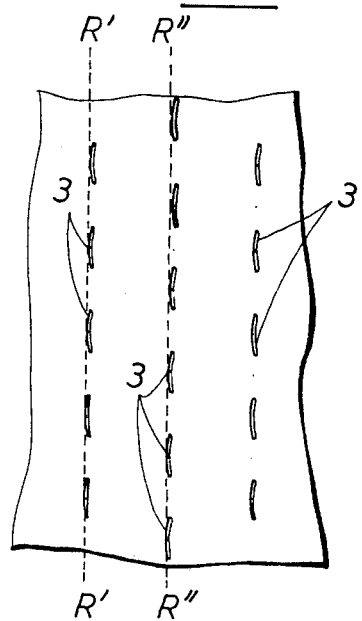
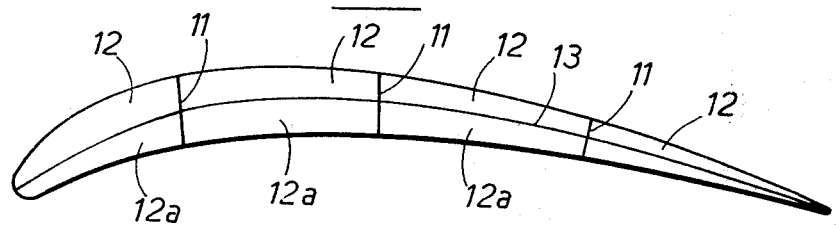

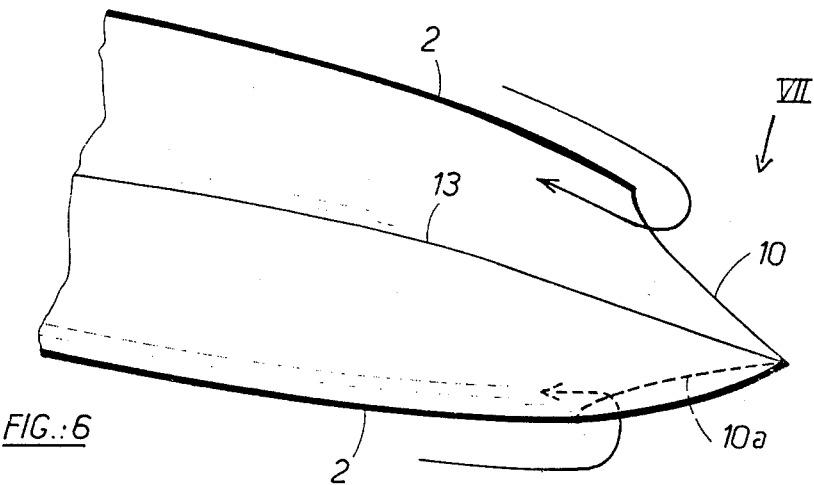
FIG.:6
FIG.:7
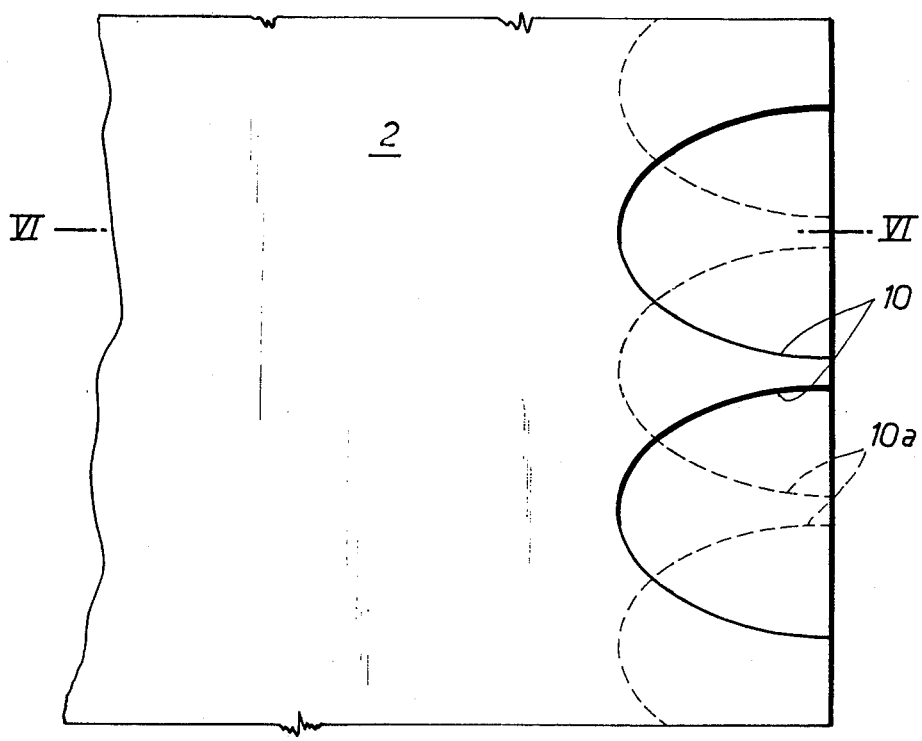

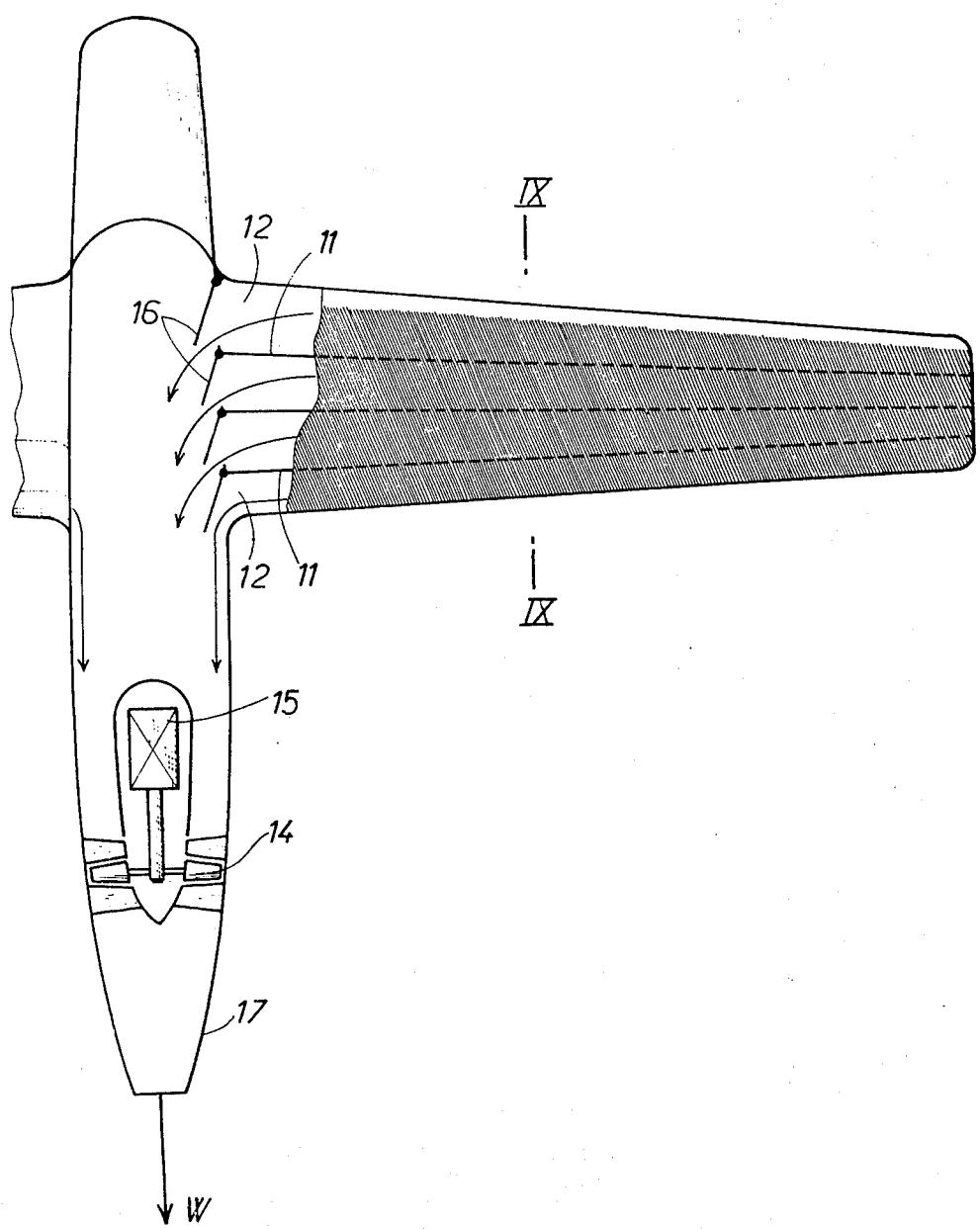
FIG.: 8

DEVICE FOR REGULATING AND RECOVERING THE BOUNDARY LAYER OVER THE SURFACE OF A BODY SUCH AS AN AIRCRAFT IN FLIGHT

The phenomenon of the boundary layer which occurs over the surfaces of a body such as an aircraft in flight has formed the object of numerous experiments and is by now sufficiently well known.

Distinction can be made between the portions of this layer in which the air flow over the aircraft surfaces is laminar and those in which this flow is or becomes turbulent.

In the former the velocity of the air particles with respect to the aircraft, which is zero in contact with the skin, increases progressively along a normal up to its maximum.

In the latter the value and direction of the velocity of the air particles depends upon space and time.

Now, the thickness of the laminar boundary layer, which is low at the leading edge of a surface, such as a wing, fuselage or control surface, tends to increase progressively in proportion as the flow leaves the leading edge and a moment is reached at which this increase in thickness produces a parting of the air streams and a changeover to turbulent conditions.

Thick laminar flow is preferable to turbulent flow because it produces a lower loss of energy.

Numerous proposals have been made tending either to accelerate the boundary layer by blowing or to eliminate it by drawing-off. The Applicant in particular is the author of certain of these proposals (Anxionnaz et al No. 2,396,911 as well as French Patent Nos. 995,985 of the March 31st 1945 and 1,001,564 of the May 29th 1947).

Acceleration of the boundary layer by blowing brings about losses of energy.

The idea of drawing in the boundary layer in order to propel it towards the rear of the aircraft is in principle better but the solutions proposed are defective because they do not take into account in a rational manner the character of the boundary layer and above all the distribution of the energy in the thickness of this layer.

The solution which the invention provides consists in principle of preventing the boundary layer from acquiring the thickness of which changeover into turbulence can be produced, whilst keeping the thickness at every point at the maximum compatible with laminar conditions, and in carrying out for that purpose a kind of planing down of the boundary layer of partial draw-offs stepped across the greater portion of the surface and regulated so as to take off only the air streams the speed of which with respect to the aircraft is lowest and at points on the surface at which the layer is thickest.

One of the characteristics of the invention consequently consists in providing, at a plurality of points distributed over the greater portion of the surface and at short intervals, orifices having their inlets directed right rearwards towards the trailing edge so that the dynamic pressure of the air is subtracted from the static pressure in the inlet; such inlets will, therefore, be called "counter-ramming intakes" in the ensuing description and appended claims. They are connected below the surface to casings connected to the suction of one or a plurality of blowers forcing the air in the direction opposite to that of the aircraft, and in which is maintained a pressure slightly lower than that which is created by the speed of flow at the inlets to these orifices.

It is thus possible not only to regulate the boundary layer so that its thickness remains compatible with laminar flow over the whole surface, but also to recover for propulsion of the aircraft the air streams which have, with respect to the aircraft, the lowest velocity or in other words have the absolute velocity nearest to that of the aircraft, which is advantageous from the point of view of the energy.

Preferably the aforesaid characteristic is combined with orifices provided in the trailing edge or in the immediate neighbourhood of this edge and of a section suitable for enabling draw-off at this point of a portion of the boundary layer much larger than at the intermediate points mentioned above and of the order of about half the flow in the boundary layer.

This combination brings about a certain number of advantages enabling friction against the air to be kept to its minimum, most of the friction slipstream energy to be recovered, the energy lost in the propulsion slipstream to be reduced, the noise created to be likewise reduced and the lift to be improved.

Other characteristics of the invention will follow from the following description given with reference to the accompanying drawings, by way of non-restrictive example only.

FIGS. 1 and 2 illustrate the principle of the invention,

FIG. 3 represents an embodiment of an orifice for drawing in the boundary layer, seen in projection onto a plane tangential to the surface of the aircraft.

FIG. 4 is a transverse section along the line IV—IV of FIG. 3 illustrating the "counterramming" design of the intake.

FIG. 5 is a view of a fragment of an aircraft surface illustrating on a scale of 1:1 a method of distribution of orifices as shown in FIGS. 3 and 4.

FIG. 6 shows in section an embodiment of counterramming intakes on the trailing edge.

FIG. 7 is the corresponding plan view.

FIG. 8 shows diagrammatically in plan a portion of an aircraft arranged in accordance with one embodiment of the invention, that is to say, one of the wings, the rear of the fuselage seen in section and a blower with a propulsion nozzle arranged at the rear portion of the fuselage.

FIG. 9 is a section of the wing along the line IX—IX of FIG. 8.

FIG. 1 shows the section through an aircraft wing, assuming for simplicity that the invention which will be described below is applied only to the control of the boundary layer on the top face of the wing. In reality the invention may likewise be effective on the bottom face and in a more general way any of the surfaces of an aircraft (fuselage, fins, control surfaces) on which a boundary layer forms during flight.

On a line near the leading edge, the trace of which is at 0 in FIG. 1, the phenomenon of the boundary layer starts to appear and this layer tends to increase in thickness along the profile O-A which has not been drawn to scale.

At a certain distance from the leading edge the increase in thickness of the boundary layer is accompanied by a disappearance of the laminar character of the flow which becomes turbulent with a consequential increase in friction and correlative drag.

In accordance with the invention, as it is desired to keep the boundary layer in laminar flow, a small fraction is drawn in through orifices arranged at points such as R, R′, R″, R‴, . . . distributed over the surface of the wing so that at each of these points this drawing-off creates a reduction in thickness of the boundary layer. Thus the thickness of the boundary layer is kept just below the limiting thickness $e$ at which parting and changeover into turbulence can be produced.

The effect produced on the boundary layer can be indicated diagrammatically by the sawtooth profile drawn in FIG. 1 in which the boundary layer has been shown shaded. From O to R the thickness of the boundary layer has increased and become RA which is such that if the thickness continued to increase the flow would become turbulent; the drawing-off at the point R is such that the thickness is reduced from A to Q, then the thickness of the boundary layer recommences increasing along a profile QA' substantially parallel with the last portion OA; the drawing-off at R' again reduces the thickness by A'Q' and so on up to the neighbourhood of the trailing edge. It can be deduced from FIG. 2 that if, for example, it is desired at each point R, R', R'', R''', etc. . . . to reduce the thickness of the boundary layer by 1/10th, the intervals such as RR' between two successive draw-off members on the profile of the wing will have to be equal to the displacement which must be impressed upon the curve of the laminar profile so that the variations in thickness AQ, A'Q', etc. are equal to 1/10th of AR. This leads to an arrangement of draw-off orifices which are small but in large numbers and at small intervals the effect of which will be to keep on the surface of the aircraft a laminar boundary layer of maximum thickness.

It is important - and a particular feature of the invention - that the fraction of boundary layer drawn in at each of the points R, R', R'', R''', etc., should be that which contains the airstreams which are the most slowed down with respect to the aircraft, that is to say, for example, those which have, with respect to the aircraft, a velocity $v$ lying between zero and about 0.1 V, V being the velocity of the aircraft with respect to the atmosphere.

This can be achieved by arranging the draw-off members located at the various points R, R', R'', R''', etc., so that their inlets are directed not towards the leading edge but towards the trailing edge as shown in FIGS. 3 and 4.

As shown in FIG. 4 an incision 3 made in the skin 2 of the aircraft, with pushing back of that one of the lips 4 which is downstream to the direction of airflow, constitutes an orifice in the form of a slit which is directed right rearwards towards the trailing edge.

Although the phenomena are rather complex, the functioning of such an orifice 3 can be explained as follows.

By reason of the counter-ramming orientation of the orifice the dynamic pressure of the airstreams is subtracted from the static pressure instead of being added to it as would be the case if the orifices were ramming intakes facing right forwards towards the leading edge. If $v$ is the mean velocity of the boundary layer in front of the slit-shaped orifice 3 over a thickness approximately equal to the width of the slit, Ps is the static pressure of the air in the region of the slit 3 and Pe is the pressure of the streams passing into the slit, one can write at least approximately:

$$Pe = Ps - \frac{V^2}{2g},$$

the pressures being expressed in air column.

If therefore, in a casing within the wing and into which the orifice 3 and numerous other similar orifices open, there is maintained, by the suction of a fan or a compressor driven by a motor of some kind, a pressure Pi lower than Ps, there will be no flow into the orifice 3 and the casing so long as $\Delta p = Ps - Pi$ is less than or equal to $V^2/2g$. For there to be a flow, that is to say, for the boundary layer to be drawn in, $\Delta p$ must be greater than $v^2/2g$ (and sufficient to create a velocity of flow into the orifice).

It can be seen that such a device is selective; in short, it only draws in those streams whose velocity with respect to the aircraft and therefore whose dynamic pressure corresponds to or is less than the difference between the pressures Ps and Pi.

In order to draw in streams of higher velocity it would in short be necessary to produce in the casing a larger pressure differential $\Delta p$.

It will be understood moreover that the slow streams undergo in their sinuous path, which includes a change of direction of 180° or U-turn in order to pass into the orifice 3, a lower pressure loss than the fast streams. Now, apart from the fact that the slow streams constitute the portion of the frictional slipstream which has received from the aircraft in motion the largest and least degraded amount of energy and the recovery of which is consequently the most valuable, the flow corresponding with these slow streams drawn through one and the same orifice will be the greater the thicker the boundary layer above this orifice and vice versa. This is favourable to preserving laminar conditions.

If on the contrary the orifices for drawing in the boundary layer were directed towards the leading edge, the velocities of flow might be confused with the velocities in the corresponding section of the boundary layer even when $Pi = Ps$ of $\Delta p = 0$. The drawing in of the boundary layer would be approximately inversely proportional to the thickness of the boundary layer, which would bring about the impossibility of preserving the thickest possible laminar layer.

An orifice such as the counter-ramming intake 3 can be obtained in a convenient fashion by punching through the metal of the skin along an arc of a circle ab (FIG. 3) and pushing the lip 4 between the points $a$ and $b$ back towards the inside so that the width of the orifice is a maximum at the center of the small crescent-shaped slit so produced and is nil at $a$ and $b$.

For greater convenience, in certain cases a piece might be inserted, both imposing the U-turn of the sucked streamlines or 180° deflection and maintaining the strength of the skin in spite of the perforation.

One can also produce on the wing continuous slits with tangential entry directed towards the trailing edge as in FIG. 4, extending in the direction of the span and distributed one after another between the leading edge and the trailing edge. But slits of this kind in large numbers are liable to complicate the production of the skin, apart from the fact that the relatively small flow through each of them will necessitate making them very narrow.

It is preferable to have orifices of relatively small size and distributed at a plurality of points, advantageously in a diamond pattern as shown in FIG. 5. In this Figure the lines R'-R', R''-R'', drawn dotted are the lines transverse to the plane of FIG. 1 which have on this Figure R' and R'' respectively as their traces. Along these lines the orifices 3 shown in FIGS. 3 and 4 are distributed in a diamond pattern.

By way of example, with a view to recovering, in each take-off region, about 1/10th of the fluid constituting the boundary layer, these orifices may be given dimensions such that the chord ab is of the order of 7 mm for a mean width of slit of the order of 1 mm and intervals of the order of 14 mm between the centers of two adjacent orifices. This is what is shown in FIG. 5 full size (intervals defined as a function of the depth of the natural laminar layer).

It will be understood that an aircraft wing, for example, will require thousands of such orifices distributed over both the top and bottom faces.

Finally, in accordance with another particular feature of the invention which is combined with the foregoing, there are provided, in the immediate neighbourhood of the trailing edge, orifices 8 (FIG. 1) orientated likewise towards the trailing edge, but this time arranged for drawing into a casing 9 a considerable portion of the boundary layer by reducing the thickness of it by the largest portion compatible with the optimum overall performance.

As shown in FIGS. 6 and 7, the orifices at the trailing edge may consist of cut-outs from the skin both from the bottom and the top faces cut like a kind of scallop 10–10a which is advantageously offset between the top face and the bottom face in order to preserve the mechanical strength of the trailing edge.

In FIG. 8 in which there is fine shading on the portion of an aircraft wing provided with drawing-off orifices selective of the boundary layer as above described, it will be seen that the interior of the wing (see also FIG. 9) is subdivided by partitions 11 (which can also form part of the working structure of the wing) into a certain number of casings 12 into which the drawing-off orifices open.

A similar arrangement is provided for the bottom face, the casings of which are designated by 12a and are separated from the top-face casings by a partition 13.

The partitions 11 are arranged so that the $\Delta p$ of all the orifices connected to one casing is the same, the load losses along the casing being compensated by a reduction of the outside pressures along its development.

The width of the casings and consequently the number of casings will be adjusted so that the difference between the outside pressures at the inlets of two drawing-off orifices opening into any one casing is low in order not to disturb the equilibrium between the respective suctions of these orifices. A certain compensation for transverse pressure differences can, however, be effected by providing drawing-off orifices which are smaller or more widely spaced over the portion of the skin where the outside pressure is higher, so as to keep the laminar boundary layer at its maximum thickness over the whole outer surface of the skin of each casing.

FIG. 8 shows by way of example four casings but more may be provided.

It will also be seen from this Figure that the casings are connected to the suction of a blower 14, as shown of axial type with a wheel driven by a motor 15 (a piston engine, for example) rotating between two crowns of fixed blading, which may be variable-pitch or not, enabling the torque to be compensated and the working point to be adjusted.

In order that this blower may be able to maintain in the various casings the depression $\Delta p$ which is appropriate, taking into account the outside pressure prevailing over the skin of the casings, there can be provided at the connection between each casing and the suction of the blower a lamination-adjustment member consisting, for example, of a hinged flap 16, the flaps of the different casings being adjustable independently of one another.

The positions of these members can be modified as a function of the thickness of the boundary layer over the respective casings so that the flows from the casings are adjusted to the value corresponding with the maximum thickness of the boundary layer.

This thickness of the boundary layer over each casing can be detected by measuring the velocity gradient in this layer at right angles to each casing by means, for example, of a small hot-wire anemometer or the like located at a short distance from the skin in the heart of the boundary layer. The indications provided by these anemometers for the various casings can enable the pilot to adjust the members 16 manually or else these members can be controlled automatically as a function of this parameter.

Furthermore, the flaps 16 can be dispensed with for those of the casings which are located on the surface of the wing, fuselage, control surface, etc. along the line of maximum depression (towards the center of the top face of a wing, for example). Furthermore an experimental fine adjustment will enable equilibrium to be achieved between the casings or to be approached by employing a higher velocity of circulation by reduction of the sections in those of the casings the feeding of which is facilitated by a higher outer pressure (for example, on the bottom face of a wing).

The blower 14 which thus draws off as described the portions of the boundary layer whose speed with respect to the aircraft is the lowest, delivers this air flow, a propulsion nozzle 17 orientated in the opposite direction to that of the absolute velocity of the aircraft.

If the whole of the boundary layer could be drawn off the frictional forces would be compensated by creating in the nozzle a relative velocity V, that is to say, an absolute velocity of zero, by recovering thus the whole of the energy of the frictional slipstream.

But various losses necessitate, in order to impose uniform motion on the aircraft, a velocity at the output of the nozzle W which is higher than V.

These losses include the dissipation of energy in the natural laminar layer as well as the energy provided by the aircraft to the elements of the boundary layer which it has not been possible or has not been desirable to collect, in particular at the rear of the surfaces.

The load losses inside the aircraft in the path of the fluid taken off do not necessitate an increase in W but only an increase in the power of the propeller.

On the contrary W will have to be increased with respect to V, when taking into account the losses in the boundary layer at the leading and trailing edges, the ratios between the induced drags and the frictional drags, the angle of climb of the aircraft and possibly the acceleration required of it.

In a practical case W will be, in uniform horizontal flight, of the order of 1.5 V; therefore the absolute velocity of the propulsion jet will be $W - V = 0.5$ V, the energy lost in the propulsion slipstream being then proportional to $(0.5)^2 = 0.25$. In present aircraft to which the invention has not been applied the same thrust would necessitate, if one accepts the same mass of air being propelled, an absolute velocity of 1.5 V with an energy lost proportional to $(1.5)^2 = 2.25$, or 9 times higher than the foregoing.

It is advisable to observe also that this considerable reduction in the velocity of ejection from the nozzle enabled by use of the invention, is accompanied by a reduction in the propulsion noise, which is an advantage.

The embodiment described having been given only by way of example, modifications and improvements can be applied to it without departing from the scope of the invention.

In particular there can be a number of blowers drawing off air from the boundary layers over different portions of the aircraft and also delivering to different nozzles. For example, for a large aircraft one can have two kinds of blower and nozzle groups, one associated with the casings in which a high depression must be maintained and the other with the casings in which the depression can be less high and which therefore need less powerful blowers.

There is advantage in the nozzle or nozzles being furnished with a device for regulation of their sections in order to enable the ejection velocity to be made to vary in accordance with the flight circumstances.

Burners can also be arranged between the blower or blowers and the nozzle or nozzles in order to heat the air and increase the thrust, for example, for take-off or in other flight circumstances.

I claim:

1. A device for controlling the thickness of the boundary layer of a flow of ambient fluid over the surface of a hollow streamlined body extending fore-and-aft from a leading edge to a trailing edge, comprising means for maintaining the thickness of the boundary layer contiguous with said total of said surface at maximum value compatible with laminar flow conditions over said surface including a multiplicity of counter-ramming intakes pointing in a rearward direction at substantially right angles with the normal to said surface of said body, substantially uniformly distributed over the total area of said surface and facing rearwards towards said trailing edge, said counter-ramming intakes leading into the inside of said hollow body, and sucking means connected to the inside of said hollow body and maintaining therein a sub-ambient pressure for sucking fluid from said boundary layer into said hollow body throughout said total of said surface through said counter-ramming intakes along a path making a U-turn of substantially 180 degrees relative to the direction of said flow, for thereby maintaining the thickness of the boundary layer contiguous with said total of said surface at maximum value compatible with laminar flow conditions over said surface.

2. Device as claimed in claim 1, wherein each counter-ramming intake is bounded by two lips spaced from each other normally to said surface, the top of said lips formed by an underpressed portion of said surface and the lower of said lips formed by a depressed portion of said surface.

* * * * *